Figure 1:
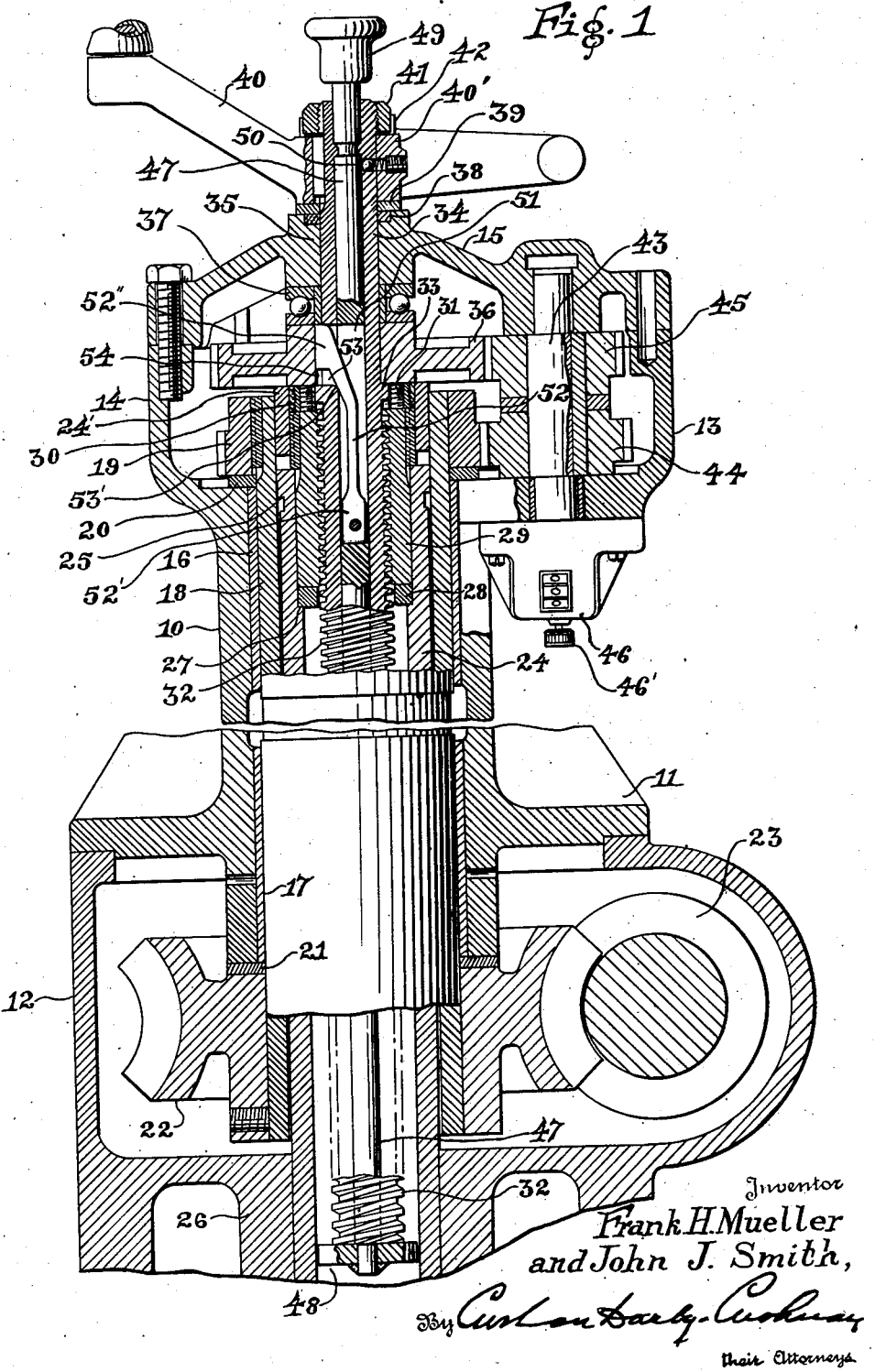

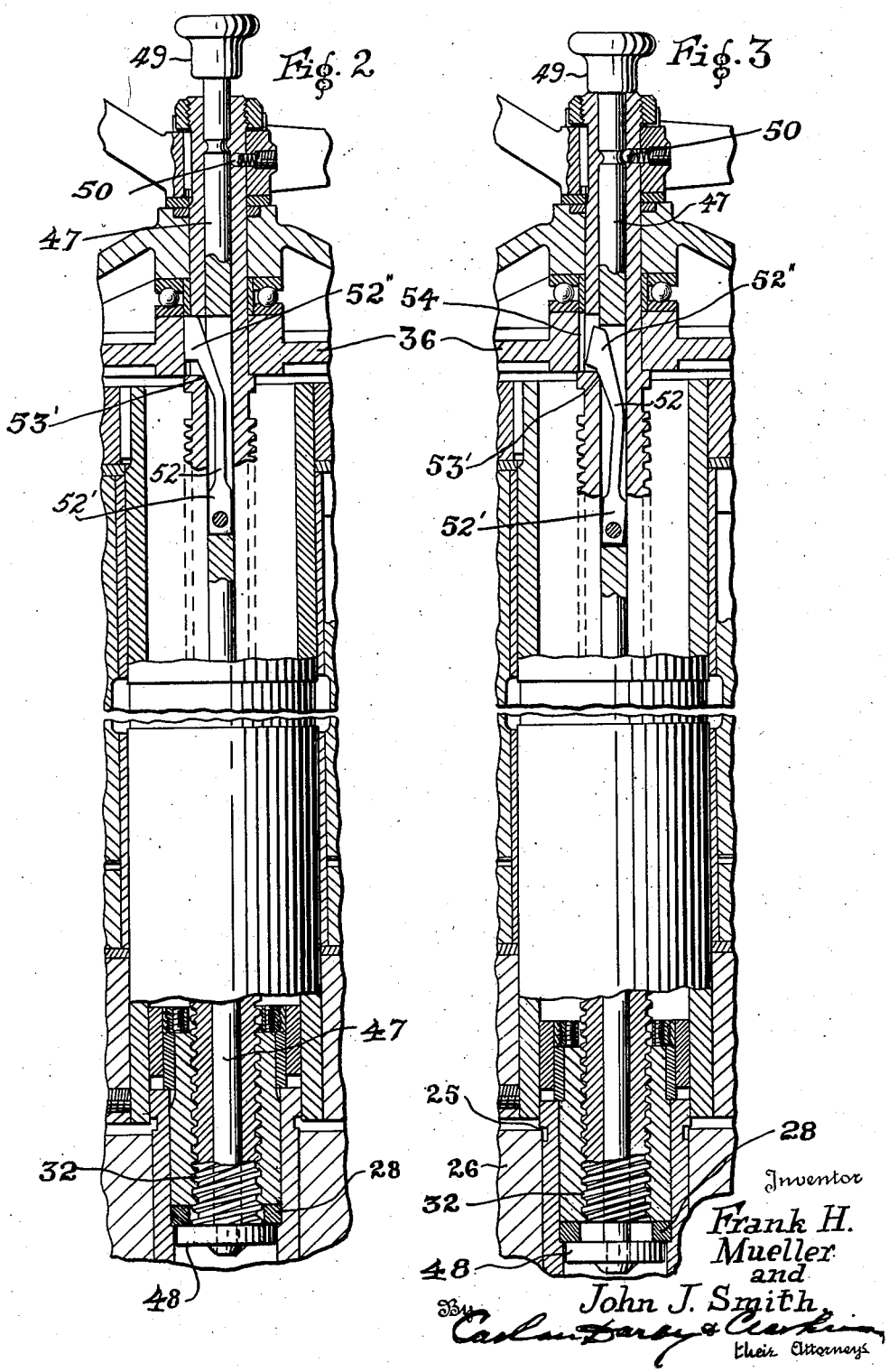

Patented May 10, 1949

2,470,044

UNITED STATES PATENT OFFICE 2,470,044

DRILLING MACHINE

Frank H. Mueller and John J. Smith, Decatur, Ill., assignors to Mueller Co., Decatur, Ill., a corporation of Illinois Application May 27, 1946, Serial No. 672,610

8 Claims. (Cl. 77—33)

This invention relates to drilling machines of the type having a projectible boring bar and has as its object to provide means for arresting the feed of the bar after a predetermined advance thereof. The invention is exemplified in the structure shown in the accompanying drawings in which Figure 1 is an axial section, with parts broken away, of a drilling machine, Figure 2 is a section similar to that of Figure 1 showing parts in a different relation, and Figure 3 is a view like that of Figure 2 showing parts in a still different relation.

The drilling machine selected for illustrative purposes herein is in general like that shown in Patent No. 1,956,129, granted April 24, 1934, to Robert H. Mueller et al., which should be referred to in supplement of the present disclosure which is directed only to the features of improvement.

In the present drawings, reference numeral 10 designates a barrel, shown in Figure 1 with a considerable intermediate portion broken out, the barrel having a bottom flange 11 forming the top wall of a housing 12. At its upper end the barrel has a bowl-like formation 13 constituting a housing 14 in conjunction with a top cap 15.

Journalled in bushings 16 and 17 in the upper and lower ends of the barrel is a drive tube 18 which is suspended from and keyed to a gear 19 supported by a thrust washer 20. Fixed to the lower end of the drive tube in the housing 12 beneath a thrust washer 21 is a worm wheel 22 engaged by a worm 23 whose counterpart in the above-mentioned patent is shown as being drivable by an air motor. Received in tube 18 is a hollow boring bar 24 whose upper portion 24' has a close sliding fit in the upper end of the drive tube and is splined to the latter. Beneath the said upper portion 24', the boring bar, for the purpose of reducing friction, is externally reduced so that a downwardly faced shoulder 25 exists. The lower reduced portion of the boring bar is journalled in a bearing 26 provided by the lower portion of housing 12. The upper interior portion of the boring bar is enlarged to provide a shoulder 27 which supports an inwardly overhanging abutment ring 28 against which is borne a coaxial nut 29 by a ring 30 threaded in the upper end of the bar and locked by set screws as at 31, the nut being keyed to the bar.

A feed screw 32 is engaged with nut 29 and extends axially of the boring bar. Above its threaded portion, the screw has a circumferential flange 33 which is surmounted by a cylindrical journal portion 34 which extends through a bearing portion 35 of the cap 15. A gear 36 is rotatably mounted on the journal portion 34 between flange 33 and an anti-friction thrust bearing 37 interposed between the hub of the gear and the bottom of bearing portion 35. Set in the upper end of the latter is an oil seal 38 above which is a thrust washer 39 which supports the screw through the hub portion 40' of a crank 40, the hub portion being keyed to the feed screw and retained by a nut 41 threaded on the latter and held by a lock washer 42.

A shaft 43 is journalled in housing 14 in parallel relation to the feed screw and has keyed thereon gears 44 and 45 in engagement respectively with gears 19 and 36, the ratios being such that when gear 19 is rotated by the drive tube, gear 36 will be driven in the same direction but at a slightly reduced speed. Reference numeral 46 designates a counter secured beneath housing 14 and driven through a suitable train from shaft 43.

Extending throughout the length of the feed screw 32 is an axial bore in which is slidably received a rod 47 which projects beyond both ends of the screw. The lower projecting end of rod 47 has fixed thereto a disc 48 shown in Figures 1 and 2 as bearing against the lower end of the screw. The disc has a running clearance with the inner cylindrical wall of the boring bar and thus serves to steady the lower end of the feed screw, this in addition to an abutment function which will presently be described. At its upper end, rod 47 has fixed thereto a knob 49 which in Figures 1 and 2 is shown as spaced somewhat above the upper end of the feed screw. If the knob is depressed to the position of Figure 3, an annular groove of rod 47 is engaged by a spring pressed detent 50.

Rod 47 has a longitudinally extending slot 51 in the lower end of which is pinned the foot portion 52' of a flat spring key 52 which is received with sliding clearance in the slot. The foot portion is substantially as wide as the bore of the feed screw and, consequently, is restrained against substantial rocking by the confining wall of the screw bore. The key has a shank angled to a head 52'' which, as shown in Figures 1 and 2, is yieldingly projected through a longitudinal slot 53 of the screw and into an axial groove 54 in the hub of gear 36, the slot 53 receiving the head with sliding clearance. In Figures 1 to 3 the angular upper portion, or shank, of the key is shown as bearing against a rounded edge 53' at the lower inner end of slot 53.

With the parts in the position of Figure 1, when the drive tube is rotated gear 36 will be driven and through the clutch constituted by key 52 and the slotted hub of gear 36, the feed screw will be driven at the speed of gear 36 which, as above mentioned, is at a somewhat smaller angular speed than the gear 19 and, consequently, nut 29 will be slowly threaded downwardly on the feed screw to advance the boring bar. In Figure 2 the boring bar has been so far advanced that ring 28 is in abutment with disc 48. Upon continued advance of the boring bar, ring 28 will carry disc 48 and therewith rod 47 downwardly so that the slot edge 53' cams the head 52" of the key inwardly to disengage it from the groove 54 whereby gear 36 is unclutched from the feed screw and the drive of the latter ceases as the parts come into the position of Figure 3.

While the automatic interruption of advancing feed at a predetermined point is a valuable feature in general, it is of particular importance in the present instance since if the advance is not arrested, the shoulder 25 will abut the top of bearing portion 26 with the possibility of considerable damage to the machine. In Figure 3 the drive has been shown as having been interrupted with shoulder 25 still somewhat spaced from the top of the bearing portion.

The counter 46 operates in the same manner as a speedometer and, as here contemplated, indicates the forward travel of the boring bar in tenths of an inch. The counter is in operation at all times when the boring bar is rotating whether the clutch is engaged or not. Therefore it is necessary at the moment when key 52 is engaged to set the counter to zero by turning its knob 46' in the usual manner.

Except when the rod 47 is held down through abutment of ring 28 with disc 48, it can be reciprocated by manipulation of knob 49. In this case the rod is held in its lower position by detent 50 against the return tendency of the spring key.

The invention is susceptible of varied embodiment and the specific disclosure herein is intended as illustrative, with variations in the form and arrangement of parts contemplated as within the scope of the invention as defined in the following claims.

We claim:

1. Apparatus of the class described comprising a support, a boring bar mounted in said support and guided for rotation and axial reciprocation, means for rotating said boring bar, a feed nut carried by said boring bar and positioned within the same, a separate feed screw mounted in said support and engaging said nut, drive means for the feed screw, and means including a member driven with the boring bar in the direction of advance for arresting the action of the drive means after predetermined advance of the boring bar.

2. Apparatus of the class described comprising a support, a boring bar mounted in said support and guided by said support for rotation and axial reciprocation, means for rotating said boring bar, a feed nut carried by said boring bar and positioned within the same, a separate feed screw mounted in said support and engaging said nut, drive means for the feed screw including a clutch, a clutch operator, and abutment means moving with said boring bar in the direction of advance and engageable with said operator to open the clutch after a pre-determined advance of said boring bar.

3. Apparatus of the class described comprising a support, a boring bar mounted in said support and guided for rotation and axial reciprocation, means for rotating said boring bar, a feed nut fixed to the boring bar, a feed screw engaging said nut, said feed screw having an axial bore, a rod reciprocable in said bore, drive means for the feed screw, means controlled upon movement of said rod in one direction to render the drive means operative and upon movement of said rod in the other direction to render the drive means inoperative, and means including a member driven with said boring bar in the direction of advance for moving said rod in said other direction after said boring bar has been advanced a certain distance.

4. Apparatus of the class described comprising a support, a boring bar mounted in said support and guided for rotation and axial reciprocation, means for rotating said boring bar, a feed screw extending in the axial direction of said boring bar, a feed nut fixed to said boring bar and engaging said feed screw, said feed screw having an axial bore, a rod reciprocable in said bore with an end thereof projecting from the end of said feed screw toward which said nut travels in the advance of said boring bar, an abutment on said projecting end, drive means for the feed screw, means controlled upon movement of said rod in the advancing direction of said boring bar to render the drive means inoperative and upon movement of said rod in the other direction to render the drive means operative, and means travelling with said boring bar in its advance for engaging said abutment after a certain advance of the boring bar whereby to displace said rod and render the drive means inoperative.

5. Apparatus according to claim 4 wherein the rod projects also from the other end of the feed screw to provide a portion accessible for manipulation.

6. Apparatus of the class described comprising a support, a boring bar mounted in said support and guided for rotation and axial reciprocation, means for rotating said boring bar, a feed screw extending in the axial direction of said boring bar, a feed nut fixed to said boring bar and engaging said feed screw, said feed screw having an axial bore, a rod reciprocable in said bore with an end thereof projecting from the end of said feed screw toward which said nut travels in the advance of said boring bar, an abutment on said projecting end, drive means for the feed screw including a wheel rotatable on the axis of the feed screw, clutch means between said wheel and feed screw and including a member controlled upon movement of said rod in the advancing direction of said boring bar to open the clutch and upon movement of said rod in the other direction to close the clutch, and means travelling with said boring bar in its advance for engaging said abutment after a certain advance of the boring bar whereby to open said clutch.

7. Apparatus of the class described comprising a support, a hollow boring bar mounted in said support and guided for rotation and axial reciprocation, means for rotating said boring bar, a feed nut fixed to said boring bar coaxially therewith, a feed screw extending axially of said boring bar and engaging said nut, said feed screw having an axial bore, a rod reciprocable in said bore with an end thereof projecting from the end of said feed screw toward which said nut travels in the advance of said boring bar, an abutment on said projecting end, drive means for the feed screw including a wheel rotatable on the axis of the feed screw, clutch means between said wheel and feed screw and including a member controlled upon movement of said rod in the advancing direction of said boring bar to open the clutch and upon movement of said rod in the other direction to close the clutch, and means fixed within said boring bar for engaging said abutment after a certain advance of the boring bar whereby to open said clutch.

8. Apparatus according to claim 7 wherein the rod projects also from the other end of the feed screw to provide a portion accessible for manipulation.

FRANK H. MUELLER.
JOHN J. SMITH.

REFERENCES CITED

The following references are of record in the file of this patent:

UNITED STATES PATENTS

| Number | Name | Date |
|---|---|---|
| 1,541,062 | Myers | June 9, 1925 |